United States Patent [19]

Kung

[11] Patent Number: 5,355,272
[45] Date of Patent: Oct. 11, 1994

[54] DISK DRIVE LOCK HAVING A HOOK MECHANISM TO ENGAGE A DISKETTE PROTECTIVE COVER PUSH ROD

[76] Inventor: Ching-hu Kung, 4th Fl, No. 9, Jen-ai Street, Yung-he City, Taipei Shien, Taiwan

[21] Appl. No.: 31,888

[22] Filed: Mar. 16, 1993

[51] Int. Cl.⁵ .................. G11B 23/28; E05B 73/00
[52] U.S. Cl. .................. 360/137; 360/99.01; 70/14; 70/58
[58] Field of Search .................. 360/99.06, 137, 97.01, 360/99.01, 97.04; 369/292; 70/169, 14, 57, 58

[56] References Cited

U.S. PATENT DOCUMENTS

| | | | |
|---|---|---|---|
| 4,616,490 | 10/1986 | Robbins | 70/14 |
| 4,655,057 | 4/1987 | Derman | 360/137 |
| 4,685,312 | 8/1987 | Lakoski et al. | 70/14 |
| 4,794,587 | 12/1988 | Cordiano | 360/97.01 |
| 4,856,304 | 8/1989 | Derman | 70/14 |
| 4,907,111 | 3/1990 | Derman | 70/14 |
| 4,918,952 | 4/1990 | Lakoski et al. | 70/57 |
| 4,924,683 | 5/1990 | Derman | 70/14 |
| 4,964,285 | 10/1990 | Lakoski et al. | 70/14 |
| 5,124,871 | 6/1992 | Smith | 360/137 |
| 5,136,862 | 8/1992 | Langen | 70/14 |
| 5,268,809 | 12/1993 | Eschenburg | 360/137 |

*Primary Examiner*—Stuart S. Levy
*Assistant Examiner*—Kevin Michael Watkins
*Attorney, Agent, or Firm*—Bacon & Thomas

[57] ABSTRACT

A lock mechanism for disk drives includes a case slightly shorter than an ordinary diskette, a lock slantly disposed in front of the case and controlled by a key, a transmission shaft extending into the case and being moved forward when the lock is locked, and a hook member pivotally connected to the transmission shaft at the end extending into the case. The case has two spring clips separately accommodated in two recesses formed at two front corners of the case and are clamped by an upper and a lower link of a linkage which connects to and moves together with the transmission shaft. When the case has been pushed into a disk drive via a disk slot, the forward movement of the transmission shaft and the linkage allows the spring clips to spring open and push against the front inner wall of the disk slot of the disk drive. The backward movement of the transmission shaft and the linkage allows the spring clips to be pressed closed, permitting the case to be freely inserted into or drawn out of the disk drive. The hook member has a hook at is free end which may hook up or release a diskette protective cover push rod in the disk drive following the forward or backward movement of the transmission shaft.

3 Claims, 7 Drawing Sheets

DISK DRIVE LOCK HAVING A HOOK MECHANISM TO ENGAGE A DISKETTE PROTECTIVE COVER PUSH ROD

BACKGROUND OF THE INVENTION

The present invention relates to a lock mechanism for disk drives, more particularly to a lock mechanism which may extend into a disk drive, stops the disk slot of the disk drive from its inner edges as well as hooks up the disk protective cover push rod inside the disk drive.

When using a computer to do data processing, data may be entered and stored on the hard disk in the system unit, or stored on a diskette by inserting the same into a disk drive. Of course, it is also workable to copy data on the hard disk to a diskette.

Since the data stored inside the computer might be extremely confidential or important, it is necessary to prevent others from accessing such data without proper authorization. There were locking devices developed for disk drives. A disk drive being locked with such a device must be unlocked by means of correct key before a diskette can be inserted into or drawn out of the disk drive.

Figure 1:
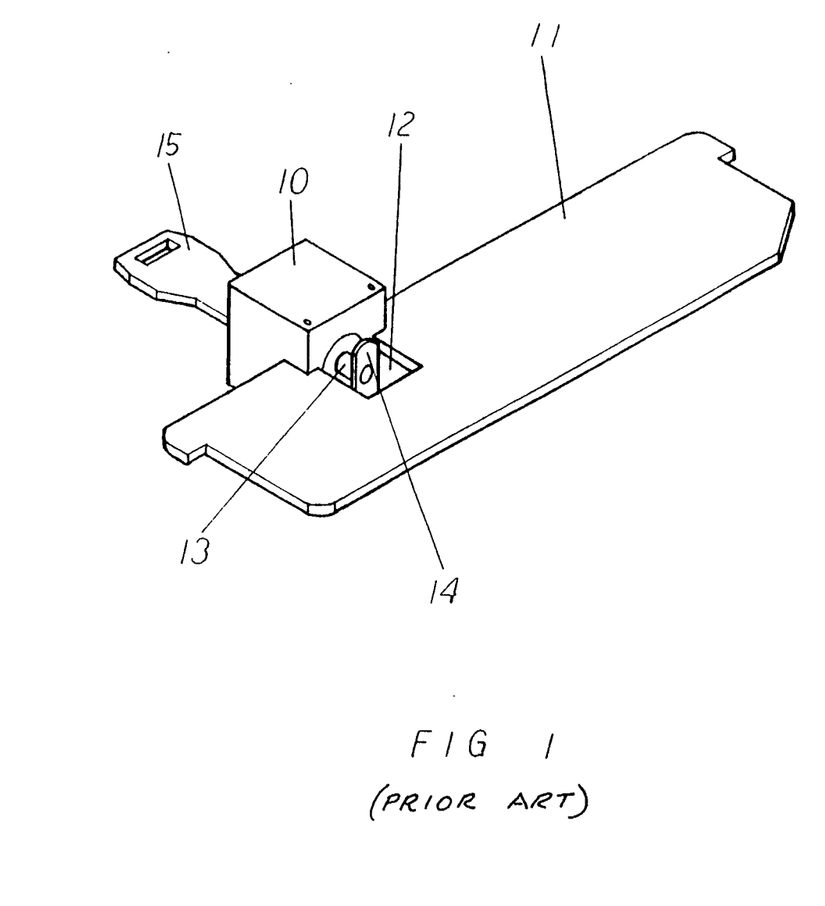
FIG. 1 shows a perspective of a conventional lock for disk drives.

Most of the existing disk drive locking devices are structurally simple. FIG. 1 illustrates an example of the conventional disk drive locking devices, which generally include a lock body 10 having a front insert member 11, a forwardly projected shaft 13, and a rectangular end member 14. The insert member 11 has a properly sized dent 12 formed in front of the lock body 10 such that the shaft 13 may extend into the dent 12 and drives the end member 14 to turn. When a matched key 15 is used and turned in the lock body 10, the shaft 13 turns, too, and drives the end member 14 to turn to a horizontal or unlocked position, or a vertical or locked position. When the end member 14 is turned to a vertical or locked position as shown in FIG. 1, its upper and lower ends shall abut against and thereby be held at the inner upper and lower edges of the disk slot into which the insert member 11 is inserted. By this way, the disk slot is closed and not available for the insertion of any diskette for operation. Reversely, when the end member 14 is turned to a horizontal or unlocked position, the entire insert member 11 may be pulled out of the disk drive along with the lock body 10, and thereby free the disk slot for inserting a diskette.

The drawbacks of such conventional disk drive lock are:
1. The disk drive is locked only by the vertically positioned end member 14. The manner in which the end member hooks and holds the inner upper and lower edges the disk slot is weak and the entire lock can be easily pulled out of the disk slot with a larger tool, such as pair of pliers, and therefore, breaks the plastic-made disk slot edges of the disk drive.
2. When the disk slot edges are broken by strong outward force, a diskette can still be inserted into the slot and the push rod inside the disk drive can still push away the protective cover of the inserted diskette, allowing the data in the computer to be stored on the diskette.

SUMMARY OF THE INVENTION

A primary object of the present invention is to provide a lock mechanism for disk drives, which includes a case slightly shorter than a diskette and suitable for inserting into a disk slot. The case is provided at one front side with a lock, the shaft of which links with a transmission shaft extending into the case such that the transmission shaft may be controlled through the lock to move forward or backward in the case and thereby drives a group of transversely extended upper and lower links. The transverse linkage further controls two spring clips in two recesses preformed at front end of the case. When the case is inserted into the disk slot and the transmission shaft is controlled through the lock to move forward, two leaves of the spring clips shall spring open and firmly press against inner wall of the disk slot. When the transmission shaft moves backward, the spring clips shall be pressed close by the transverse linkage, allowing the entire case to be pulled out of the disk drive.

Another object of the present invention is to provide a lock mechanism for disk drives, of which the transmission shaft may, by means of its far end which deeply extends into the case, drive a hook member to move into or out of a dent preformed at rear side of the case, permitting the hook member to restrain the movement of the push rod in the disk drive and thereby prevents the disk drive from operating and the stored data from being copied without authorization.

BRIEF DESCRIPTION OF THE DRAWINGS

The other features and advantages of the present invention may be best understood through the following detailed description of the preferred embodiment and the accompanying drawings, wherein.

DETAILED DESCRIPTION OF THE PREFERRED EMBODIMENTS

Figure 2:
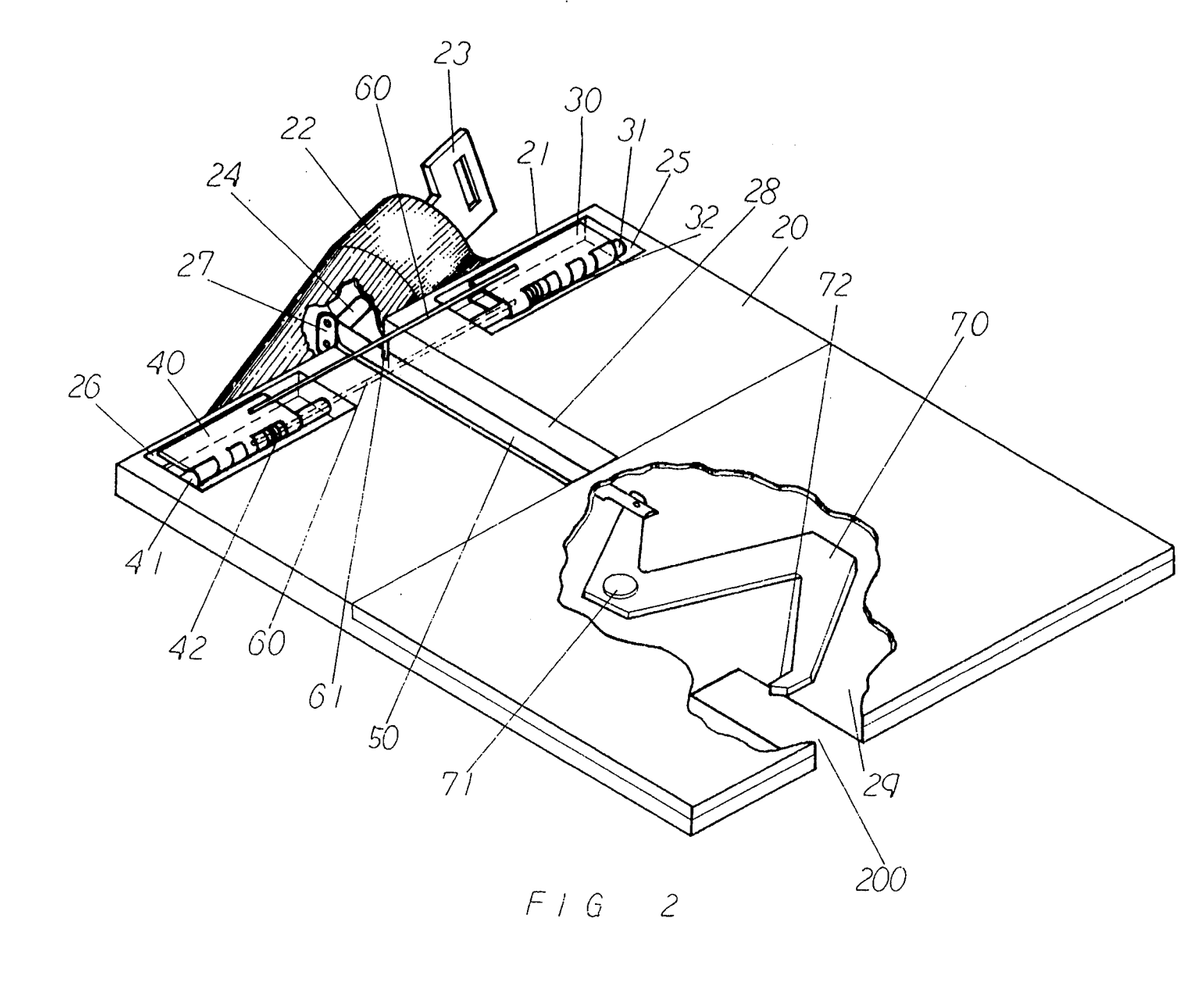
FIG. 2 is a perspective of an embodiment of the present invention, a portion of the case being cut away for purpose of illustrating the hook member inside the case.

With reference to FIG. 2, the present invention mainly includes a case 20 which is slightly shorter than an ordinary diskette and has a lock 22 slantly disposed at a front side 21 of the case 20. The lock 22 has a shaft 24 which can be driven to turn with a key 23.

Figure 4:
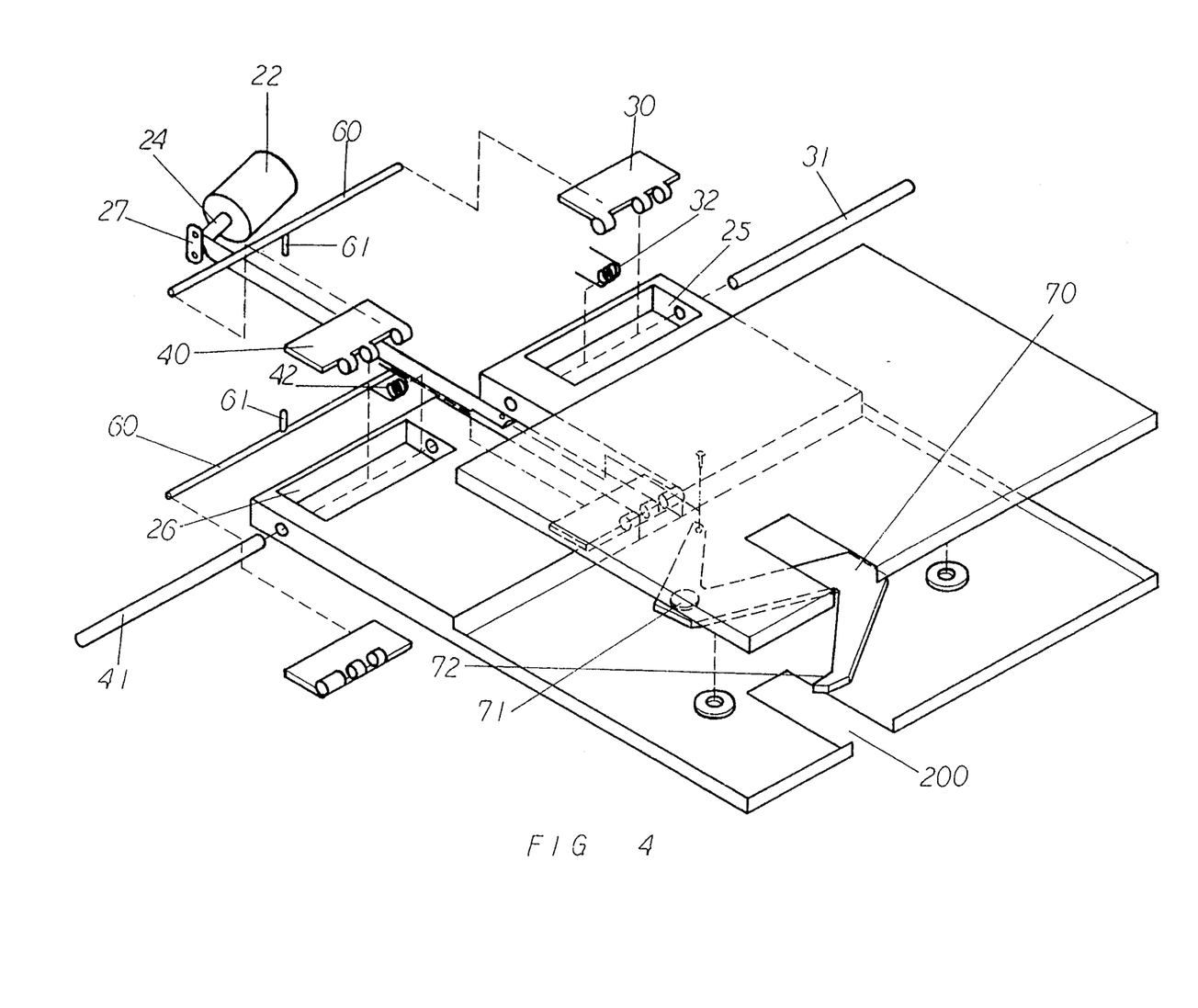
FIG. 4 is a disassembled perspective of the embodiment shown in FIG. 2.

The case 20 further has two recesses 25, 26 formed near its front side 21 to accommodate spring clips 30, 40, respectively. With reference to FIG. 4, the spring clips 30, 40 each consist of two leaves that are pivotally joined together at one side with an axle 31 or 41; on the axles 31, 41, spring coils 32, 42 each with two extended straight ends are respectively put over such that the extended straight ends of the spring coils 32, 42 abut the spring clips 30, 40 against their inner surfaces, respectively. The spring clips 30, 40 spring open at a suitable angle when their two leaves are free of any external forces, and are flattened when their two leaves are subject to external forces.

Referring to FIG. 2, the shaft 24 of the lock 22 connects an eccentric member 27 at one end opposite to a key hole end of the lock. When the shaft 24 is turned through the turning of the key 23, the eccentric member 27 shall move accordingly and thereby drive a transmission shaft 50 connected to the eccentric member 27 to move forward or backward. The entire transmission shaft 50 extends into a central groove 28 preformed in the case 20.

A transverse linkage 60 including an upper and a lower link in adequate length and a central supporting rod 61 between the upper and the lower links is disposed in such manner that the upper and the lower links transversely abut upon the upper and the lower outer surfaces of the spring clips 30, 40, respectively, with the central supporting rod 61 passing through the transmission shaft 50 at a proper point.

As shown in FIG. 2, the case 20 has a rear hollow compartment 29 formed from an upper and a lower housing member. A dent 200 is formed on the hollow compartment 29 at a proper position for a diskette protective cover push rod inside the disk drive to pass therethrough. Inside the hollow compartment 29, a substantially S-shaped hook member 70 is disposed such that one end of the hook member 70 pivotally connects to the transmission shaft 50 at an end opposite to the eccentric member 27. A pivot 71 is further provided on the hook member 70 at a proper point to loosely join the hook member 70 and the case 20. The other free end of the hook member 70 is a hook 72 which generally extends toward and ends near the dent 200.

Figure 5:
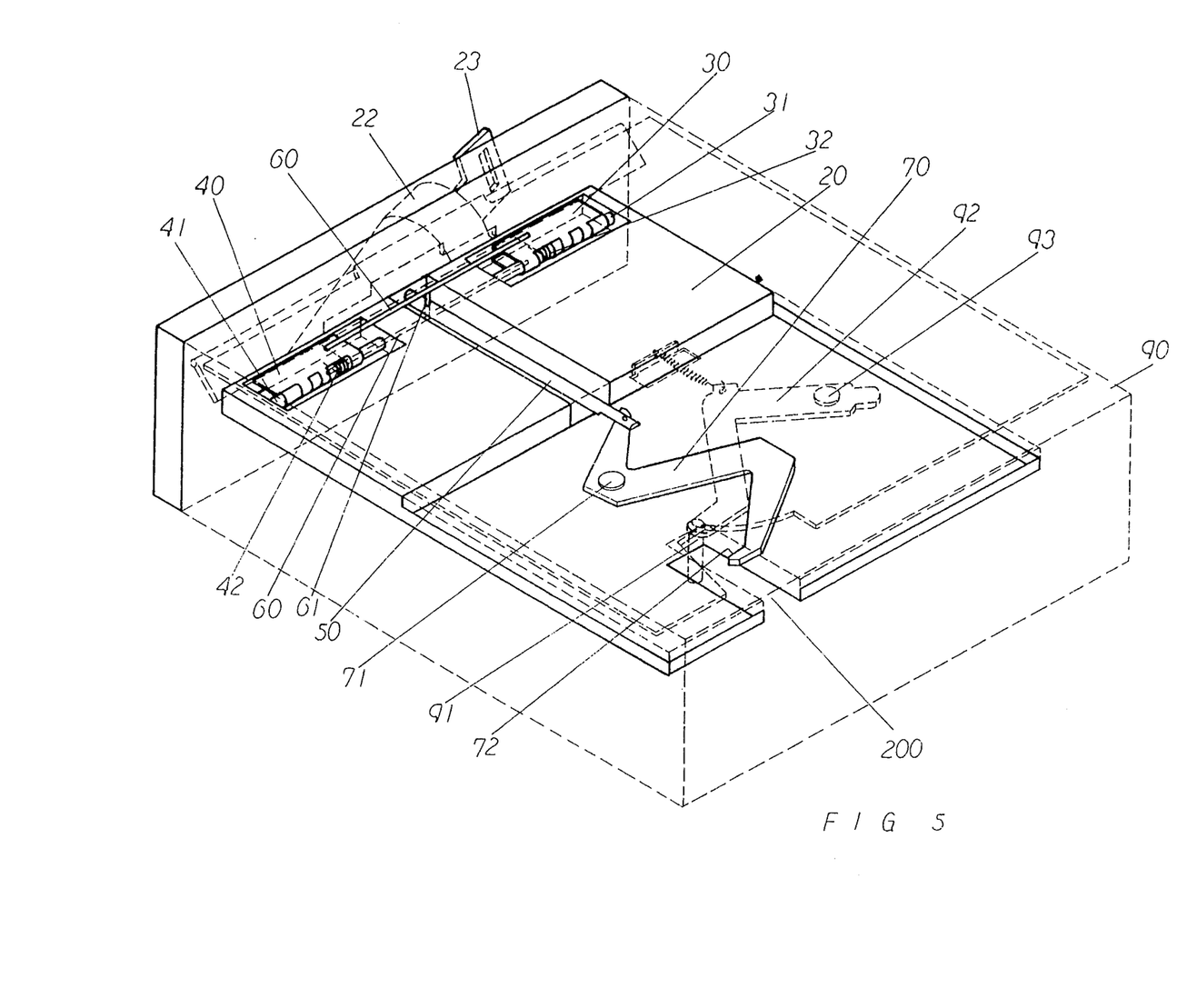
FIG. 5 illustrates the position of the present invention in a disk drive.

As shown in FIG. 5, the lock mechanism according to the present invention can be inserted as an ordinary diskette into a disk drive 90 with the lock 22 remaining outside the disk drive 90. When the case 20 is completely pushed into the disk drive 90 via a disk slot thereof, the dent 200 shall just receive the diskette protective cover push rod 91 inside the disk drive 90. The push rod 91 is disposed at one end of a diskette cover push member 92 of the disk drive 90 and vertically extends downward therefrom for a certain length. The push member 92 also has a pivot 93 which allows the push member 92 and the push rod 91, accordingly, to push away the diskette protective cover when the diskette is pushed into the disk drive in a correct and normal manner.

Figure 7:
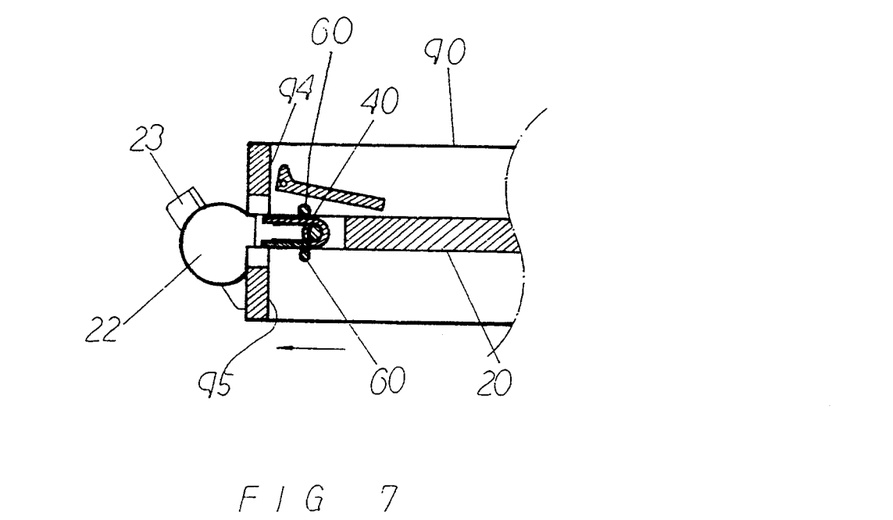
FIG. 7 is a fragmentary, sectional view showing the relation of the spring clip to the inner edges of the disk slot when the mechanism according to the present invention is unlocked.

When the case 20 is completely pushed into the disk drive 90 and the lock 22 is unlocked, as shown in FIGS. 2, 5, and 7, the transverse linkage 60 is at a position nearer the front side of the case 20, clamping the two spring clips 30, 40 to a flattened state and thereby allowing the entire case 20 to be freely inserted into or drawn out of the disk drive 90 via the disk slot.

Figure 3:
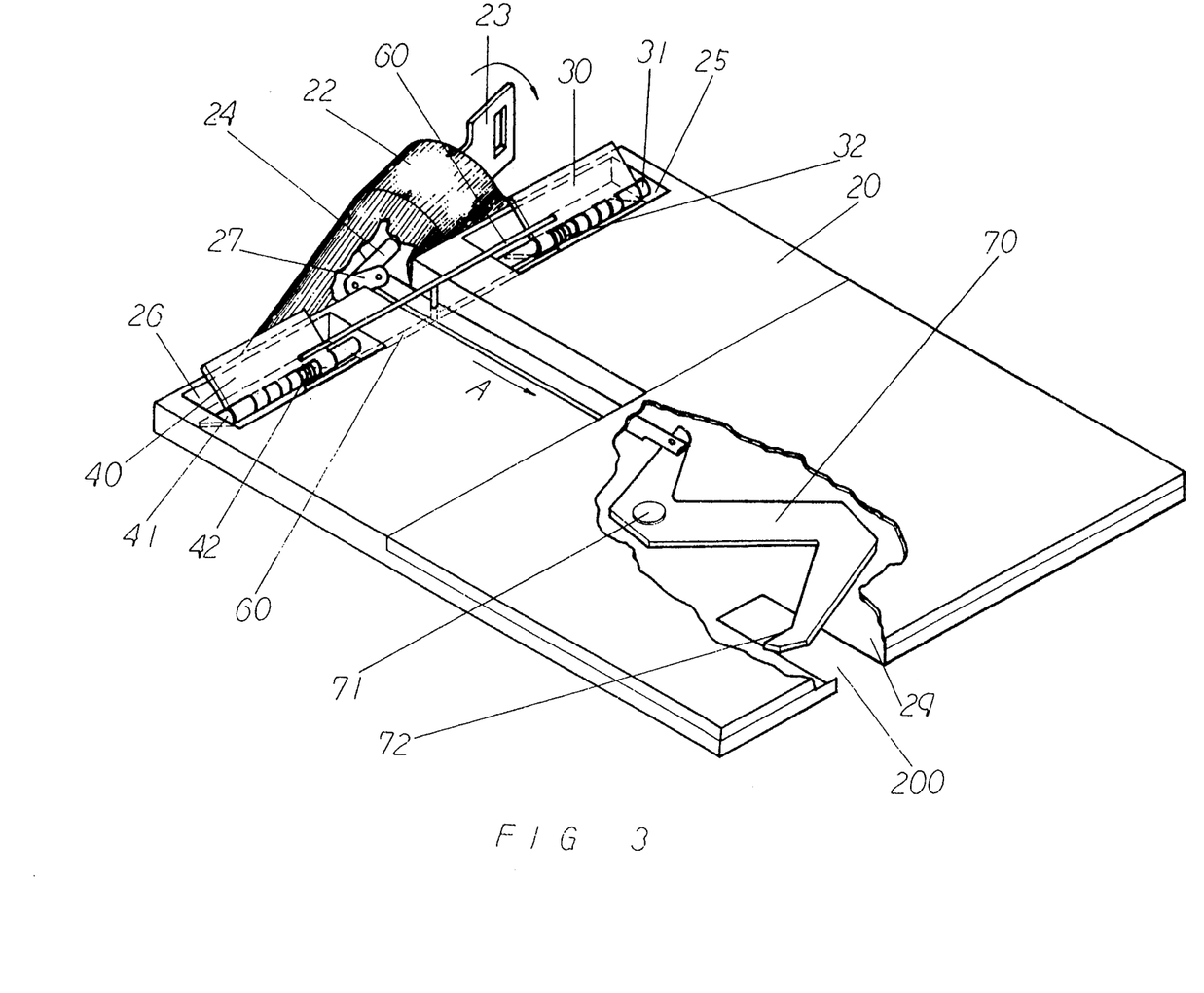
FIG. 3 is another perspective of FIG. 2, wherein the hook member has been driven to move forward and bias and the spring clips have sprung open.
Figure 8:
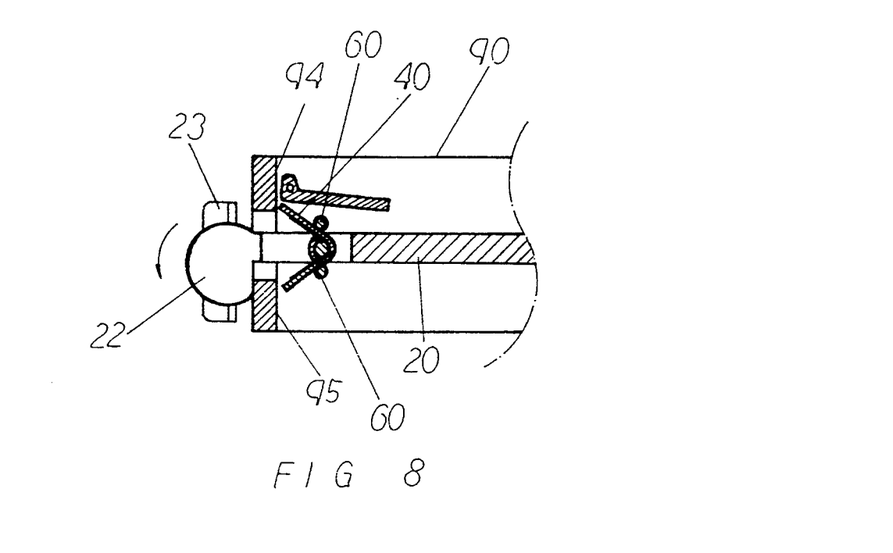
FIG. 8 is a fragmentary, sectional view showing the relation of the spring clip to the inner edges of the disk slot when the mechanism according to the present invention is locked.

When the lock 22 is locked, as shown in FIG. 3, the transmission shaft 50 is driven by the shaft 24 and the eccentric member 27 to move in the direction as indicated by arrow A. The movement of the transmission shaft 50 shall cause the transverse linkage 60 to move in the same direction and gradually toward the axles 31, 41 of the spring clips 30, 40. At this point, the clamping force from the linkage 60 against the spring clips 30, 40 becomes smaller than the spring force from the spring coils 32, 42, allowing the leaves of the spring clips 30, 40 to spring open to a V-shaped figure, as shown in FIG. 8. The sprung open leaves of the spring clips 30, 40 shall therefore push against the upper and the lower inner edges 94, 95 of the disk slot of the disk drive 90, locking the entire case 20 in the disk drive 90 so it cannot be drawn out of the disk slot.

Figure 6:
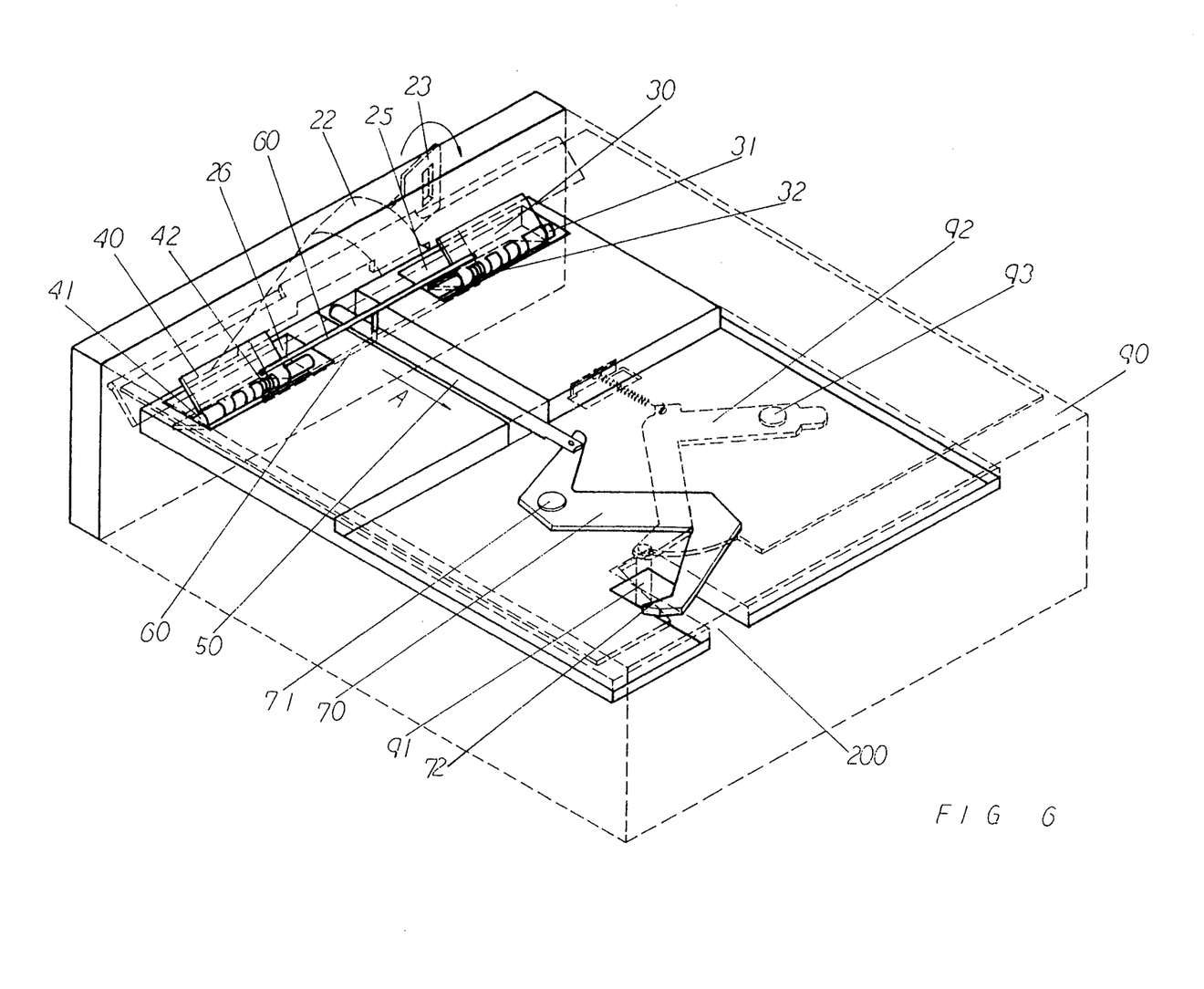
FIG. 6 is similar to FIG. 5 except that the hook member has been driven to hook up the diskette protective cover push rod.

When the transmission shaft 50 moves forward in the direction indicated by the arrow A, its front end shall, at the same time, push the hook member 70 to bias about the pivot 71, allowing the hook 72 to approach the push rod 91, as shown in FIG. 6. At this point, the diskette protective cover push member 92 of the disk drive 90 shall be stopped from moving.

When the spring clips 30, 40 have sprung open to form a V-shaped figure, they provide multiple bearing points on the front inner wall of the disk slot of the disk drive 90 when they lock the disk drive 90, and therefore, provide effectively enhanced locking strength that is strong enough to resist outward force applied on the lock 22 and the case 20, accordingly. In the event a pull force is so strong that it finally pulls the case 20 out of the disk drive 90, the hook member 70 will at the same time be pulled outward and therefore damage the push rod 91 and the push member 92 that are hooked and locked by the hook 72. That means, even if the lock mechanism according to the present invention is willfully broken, the unauthorized user or the thief shall fail to get the data via the disk drive.

What is claimed is:

1. A lock mechanism for disk drives having a diskette protective cover push rod and comprising: a case; a lock slantly disposed at a front side of said case and having a shaft which is turnable by means of a key; an eccentric member connected to said shaft; a transmission shaft having a first end connected to said eccentric member and a second end extending into said case; a hook member pivotally attached to said case and connected to said second end of said transmission shaft, the hook member having a hook formed thereon; said case defining two separate recesses formed near a front side thereof; two spring clips separately disposed in said recesses and being clamped by a linkage having an upper link and a lower link which respectively transversely pass across a top and a bottom of said recesses; said linkage having a central supporting rod which vertically passes through said transmission shaft such that movement of said transmission shaft drives said linkage to move forward or backward; said transmission shaft being moved forward or backward by turning said shaft and said eccentric member when said key is turned to lock or unlock said lock whereby, when said key is turned to lock said lock, said transmission shaft is moved forward thereby causing said linkage to move forward allowing said spring clips to spring open, and moving said hook member to bias, allowing said hook of said hook member to engage the diskette protective cover push rod in said disk drive.

2. A lock mechanism for disk drives as claimed in claim 1, wherein said spring clips each have two leaves which are pivotally connected with an axle and a spring coil over said axle such that two extended straight ends of each of the spring coils firmly abut against inner surfaces of said leaves of said spring clips; said leaves springing open when said transmission shaft moves forward and said linkage clamping said spring clips move forward and said leaves being pressed closed when said transmission shaft and said linkage move backward.

3. A lock mechanism for disk drives as claimed in claim 1, wherein said case defines a rear hollow compartment which is formed from an upper and a lower housing member for said hook member to be accommodated therein and defines a dent for said diskette protective cover push rod of said disk drive to pass through; and said hook member comprises substantially an S-shaped member which is loosely connected to said lower housing member of said case by means of a pivot such that said hook of said hook member may approach said dent when said hook member is driven by said transmission shaft.

* * * * *